United States Patent
Youngwerth et al.

(10) Patent No.: US 8,978,858 B2
(45) Date of Patent: Mar. 17, 2015

(54) ADJUSTABLE HYDRAULIC SLAVE CYLINDER FOR CLUTCH INCORPORATING A SPRING BIASED PRESSURE PLATE

(76) Inventors: Albert J. Youngwerth, Boise, ID (US); Sean G. Brown, Boise, ID (US); Karl E. Jensen, Meridian, ID (US); Logan P. Krueger, Boise, ID (US)

( * ) Notice: Subject to any disclaimer, the term of this patent is extended or adjusted under 35 U.S.C. 154(b) by 231 days.

(21) Appl. No.: 13/524,536

(22) Filed: Jun. 15, 2012

(65) Prior Publication Data
US 2013/0334003 A1  Dec. 19, 2013

(51) Int. Cl.
*F16D 25/08* (2006.01)
*F16D 25/12* (2006.01)

(52) U.S. Cl.
CPC ............ *F16D 25/086* (2013.01); *F16D 25/126* (2013.01)
USPC .................. 192/85.5; 192/70.251; 192/85.53; 192/85.62; 192/110 R; 192/111.11

(58) Field of Classification Search
CPC ..................................................... F16D 25/086
USPC ........ 192/85.5, 85.53, 85.62, 111.11; 60/584; 92/13.6
See application file for complete search history.

(56) References Cited

U.S. PATENT DOCUMENTS

| | | | | |
|---|---|---|---|---|
| 3,321,913 A | * | 5/1967 | Harrah ............................ | 60/590 |
| 4,565,269 A | * | 1/1986 | Kawasaki et al. .......... | 192/70.12 |
| 4,566,577 A | * | 1/1986 | Tsuboi ......................... | 192/85.5 |
| 6,102,183 A | * | 8/2000 | Gerken ....................... | 192/85.53 |
| 7,823,713 B1 | * | 11/2010 | Overton ....................... | 192/85.5 |

* cited by examiner

*Primary Examiner* — Richard M. Lorence

(57) ABSTRACT

A novel adjustable slave cylinder is disclosed. The improved slave cylinder is particularly well suited for use with a clutch incorporating an expanding friction disk. The adjustable slave cylinder provides a means for adjusting a clutch pressure plate's position via an adjustment mechanism external to the inside of an engine.

6 Claims, 6 Drawing Sheets

ADJUSTABLE HYDRAULIC SLAVE CYLINDER FOR CLUTCH INCORPORATING A SPRING BIASED PRESSURE PLATE

BACKGROUND OF THE INVENTION

This invention relates to a clutch system of the friction type placed in a power transmission system. Typical clutch systems include a clutch input such as a clutch basket, a clutch output such as a center clutch, and one or more plates making up a clutch pack and disposed between the clutch input and clutch output. When the clutch pack is compressed, the clutch input and clutch output become rotationally coupled. The clutch pack is typically compressed by a pressure plate; the pressure plate typically providing a compressive force via a spring mechanism or through a centrifugally actuated mechanism.

Typically, such clutch systems include a clutch disengagement system consisting of a lever mechanically coupled to the pressure plate such that when the lever is actuated, the pressure plate's compressive force on the clutch pack is removed, disconnecting the rotational coupling between the clutch input and clutch output. Clutch disengagement systems typically couple the lever to the pressure plate mechanically through a hydraulic actuation system or a cable actuation system.

Most motorcycles incorporate a manual transmission coupled to the engine via a multi-plate clutch assembly. Typically, the multi-plate clutch is engaged/disengaged by the driver via a lever mounted on the handlebar. Although the lever operated clutch allows the driver to control the clutch engagement/disengagement, often times motorcycle drivers find the clutch lever difficult to operate smoothly. New riders have difficulty adjusting to smoothly engaging the clutch while operating the throttle to move the vehicle from a standing start. Experienced riders may need to partially disengage the clutch when traveling slowly to allow the engine to continue running without stalling. Motorcycle racers often have a difficult time controlling the engagement of the clutch and the application of the throttle to maximize acceleration. Off-road motorcycle racers often need to stop the rear wheel suddenly with the rear brake, causing the engine to stall if the clutch is not first disengaged. An automatic clutch can help overcome many of the problems associated with a manual clutch.

U.S. patent application Ser. No. 12/412,245 discloses an automatic clutch system incorporating an expanding friction disk and is incorporated herein by reference. One of the benefits of the improved automatic clutch system is the ability for the operator to override the automatic engagement of the clutch via a clutch lever without a significant change in how the clutch lever responds due to the centrifugal mechanism in the automatic clutch. Such a clutch system requires the pressure plate to be lifted away from the clutch pack to function properly. In application Ser. No. 12/412,245, lifting the pressure plate away from the clutch pack is accomplished with an adjuster within the engine cases.

However, for some motorcycle operators, the ability to adjust the position of the pressure plate without opening the engine cover to gain access to the clutch is important. Being able to adjust the position of the pressure plate externally allows the operator to make adjustments to the clutch system to compensate for clutch pack wear for example. By adjusting the position of the pressure plate so that it comes in contact with the clutch pack, allows the operator to quickly and easily configure the clutch so that when the engine is not spinning, the clutch is engaged. In this configuration, the clutch operation is similar to a manual clutch and allows the operator to "bump start" the engine. When the engine is off, with a gear selected and the clutch lever engaged, rolling the motorcycle at sufficient speed and then suddenly releasing the clutch lever to engage the clutch, can start the engine.

For typical hydraulic clutch disengagement systems, no such provision exists for positioning the pressure plate relative to the clutch pack through an external adjuster.

Hydraulic clutch disengagement systems are well known in the art and are typified by systems made by Magura and Brembo and included on motorcycles such as those provided by KTM such as the KTM model year 2010 KTM 250 XCW.

A typical hydraulic clutch disengagement system includes a master cylinder incorporating a reservoir for hydraulic fluid and a lever acting on a piston. A slave cylinder incorporates a bore and a piston; the piston typically acts upon the clutch throwout to lift the pressure plate for disengagement. A hydraulic line typically couples the master and slave cylinders and provides a conduit for the hydraulic fluid.

Therefore a need exists for an adjustment mechanism with adjustment access external to the inside of the engine that can lift the clutch pressure plate to create a gap between the pressure plate and clutch pack. For typical hydraulically actuated clutch disengagement systems, the adjustment mechanism should maintain the use of the clutch lever maintaining the clutch levers capability to manually lift the pressure plate.

It is therefore an object of the present invention to provide an adjuster mechanism with adjustment access external to the inside of the engine, for a typical hydraulic clutch disengagement system that allows a gap between the pressure plate and clutch pack to be created and adjusted while retaining the capability to manually lift the pressure plate to force disengagement of the clutch.

The present invention for typical hydraulically actuated clutch disengagement systems is disclosed in FIGS. 1 through 6.

DETAILED DESCRIPTION OF THE INVENTION

Figure 1:
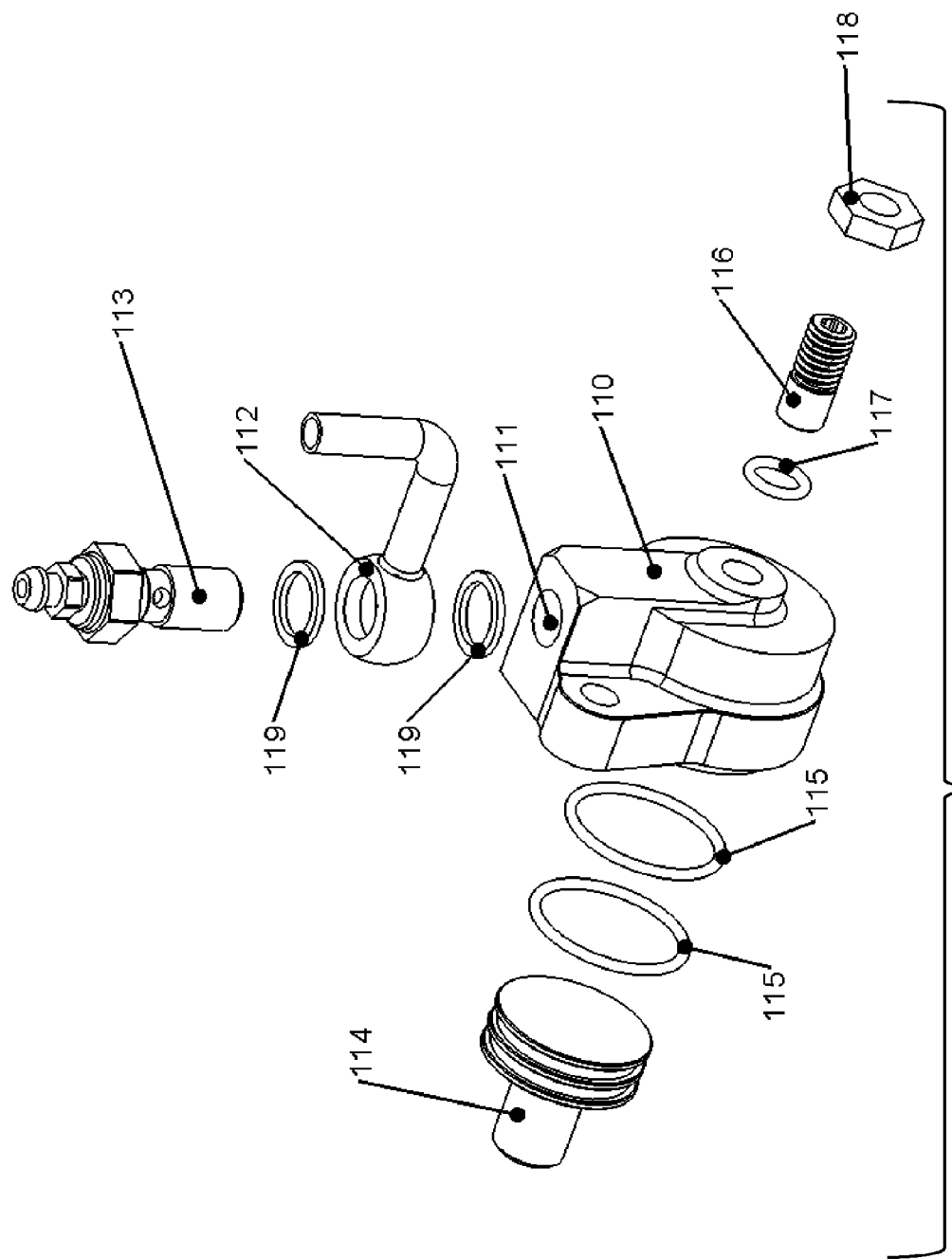
FIG. 1 is an exploded view of the present invention.

Reference throughout this specification to "an embodiment," or similar language means that a particular feature, structure, or characteristic described in connection with the embodiment is included in at least one embodiment of the present invention. Thus, appearances of the phrases "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to give a thorough understanding of the embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Hydraulic clutch disengagement systems are well known in the art and are typified by systems made by Magura and Brembo and included on motorcycles such as those provided by KTM such as the KTM model year 2010 KTM 250 XCW.

A typical hydraulic clutch disengagement system includes a master cylinder and slave cylinder with a hydraulic line coupling the master cylinder and slave cylinder together with a conduit of hydraulic fluid. The master cylinder incorporates a reservoir for hydraulic fluid and a lever acting on a piston. The slave cylinder incorporates a bore and a piston. When the lever of the master cylinder acts on the piston within the master cylinder hydraulic fluid is displaced displacing the piston within the slave cylinder. The piston within the slave cylinder typically acts upon a clutch throwout to lift a clutch pressure plate and provide clutch disengagement.

When the lever of the master cylinder is in the disengaged position and not acting on the master cylinder piston, typically, an open port exists between the slave cylinder piston and the reservoir of the master cylinder. The slave cylinder typically incorporates a spring that pushes the piston in the slave cylinder towards the pressure plate. Because an open port exists to the master cylinder reservoir, the slave cylinder is free to move inward or outward towards the pressure plate to allow for self-adjustment of the slave cylinder piston position relative to the pressure plate position.

When the lever of the master cylinder is in the engaged position and acting on the master cylinder piston, the open port between the reservoir and the slave cylinder is closed, and the master cylinder piston acts on the slave cylinder piston through the fluid conduit displacing the slave cylinder piston and moving the position of the pressure plate. When the clutch lever is in the engaged position, the open port between the reservoir and the slave cylinder is closed, and no self-adjustment can take place.

The present invention provides for a novel, external adjustment mechanism suitable for use in a clutch system that requires a gap to be formed between the pressure plate and clutch pack; such as disclosed in application Ser. No. 12/412,245. Two embodiments are disclosed for a typical hydraulic clutch disengagement system.

FIGS. 1 through 5 disclose a preferred embodiment of a novel adjustable slave cylinder 100 configured to be used in a typical hydraulically actuated clutch disengagement system connected to a typical master cylinder.

Figure 6:
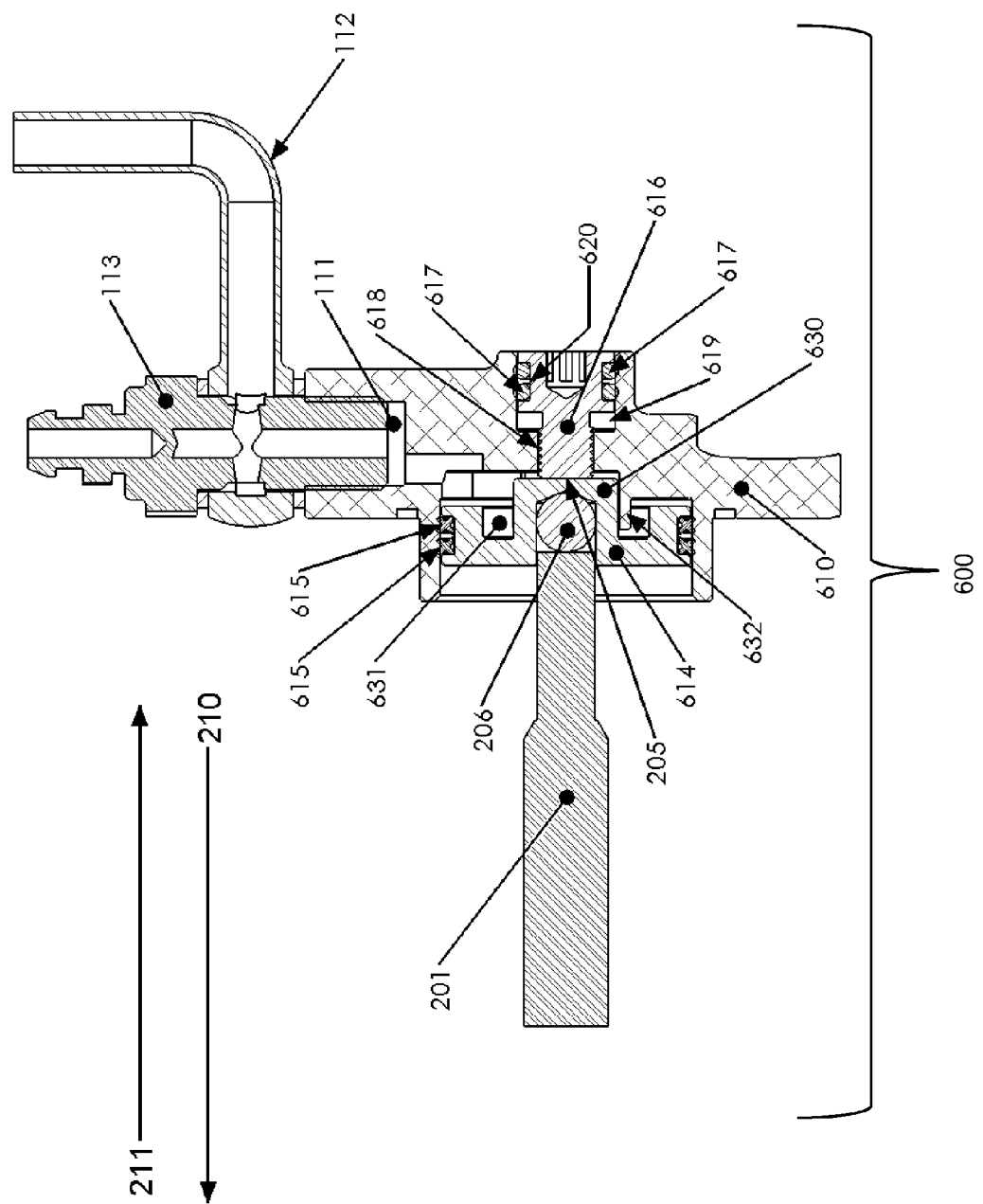
FIG. 6 is a section view of another embodiment of the present invention designed for minimal thickness.

FIG. 6 discloses another embodiment of a novel adjustable slave cylinder 600 where the slave piston and threaded adjuster are designed to allow for minimum thickness.

As can best be seen in FIG. 1, the novel adjustable slave cylinder 100 consists of a body 110, having an input port 111 that connects the adjustable slave cylinder 100 to an input hydraulic line 112 using a banjo bolt 113 with sealing crush washers 119. The adjustable slave cylinder 100 has a slave piston 114 with slave piston sealing o-rings 115. The adjustable slave cylinder 100 has a threaded adjuster 116 with adjuster o-ring seal 117 and an optional lock nut 118.

Figure 2:
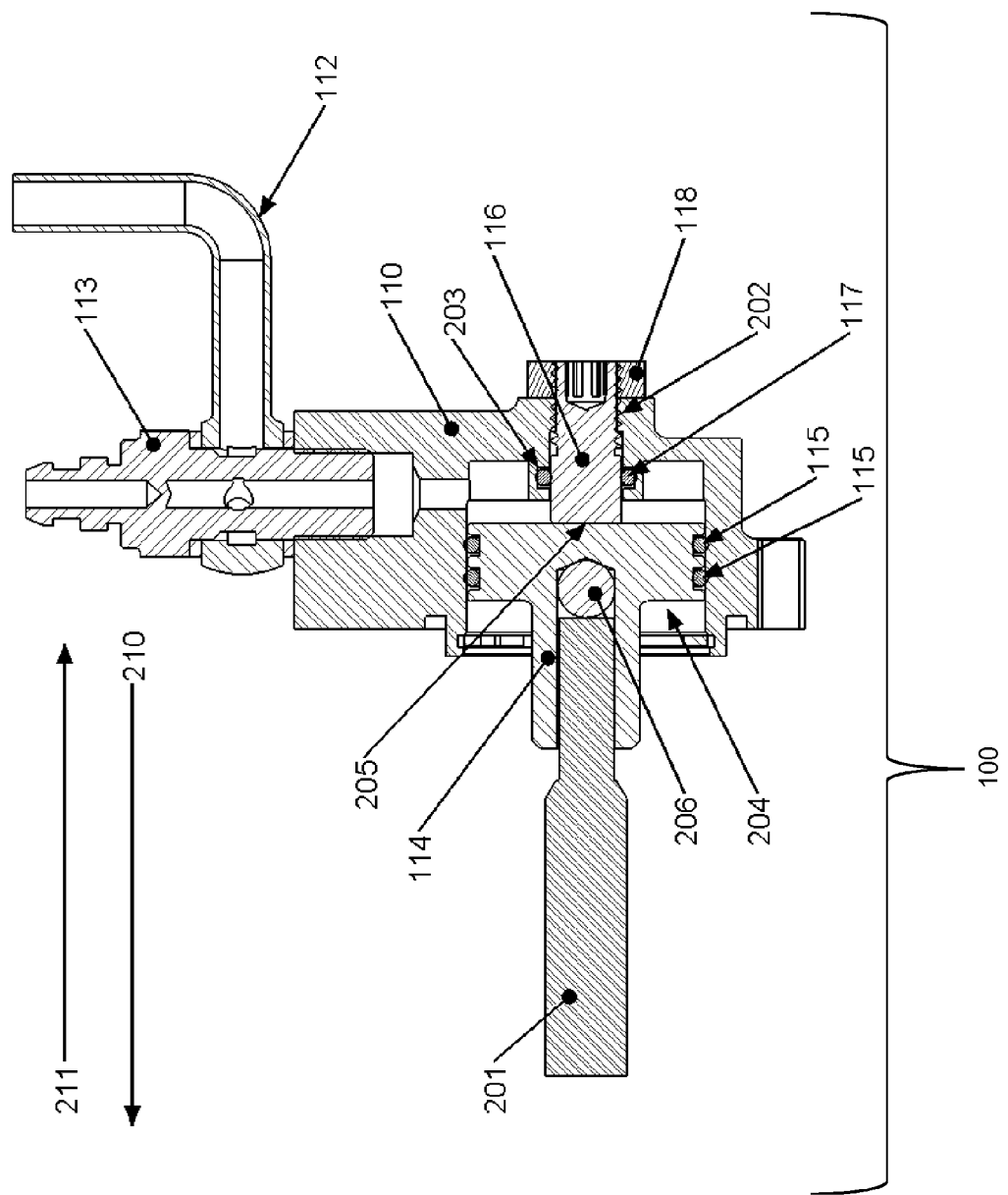
FIG. 2 is a section view of the present invention configured for use in a hydraulically actuated clutch disengagement system, wherein the clutch disengagement system is not actuated and the novel adjuster mechanism is adjusted to lift the pressure plate to create an installed gap.

FIG. 2 discloses a cross-section view of the novel adjustable slave cylinder 100 having a slave piston 114 which is configured to push against a throw-out rod 201. The adjustable slave cylinder 100 has a body 110 having a threaded hole 202 for the threaded adjuster 116 to thread into. The adjustable slave cylinder 100 has a body 110 having an o-ring groove 203 which contains the adjuster o-ring seal 117 to seal between the body 110 and the threaded adjuster 116 preventing hydraulic fluid from escaping the system and contaminants from entering the system. The adjustable slave cylinder 100 has a body 110 containing a bore 204 which contains the slave piston 114 with slave piston sealing o-rings 115. The slave piston sealing o-rings 115 provide a seal between the slave piston 114 and bore 204 allowing the system to maintain pressure and prevent hydraulic fluid from escaping between the slave piston 114 and bore 204. The threaded adjuster 116 is configured to push against the slave piston 114 through the piston locating surface 205 for the purpose of positioning the slave piston 114 within the body 110.

The threaded adjuster 116 threads into the threaded hole 202 of the body 110. The threads of the threaded hole 202 and the threads of the threaded adjuster 116 are configured such that when the threaded adjuster 116 is turned clockwise relative to the body 110, the threaded adjuster 116 moves in an outward direction 210. Consequently, when the threaded adjuster 116 is turned counter-clockwise relative to the body 110, the threaded adjuster 116 moves in an inward direction 211.

A lock nut 118 allows the position of the threaded adjuster 116 to be fixed into a position. In another embodiment, the adjuster o-ring seal 117 provides adequate friction to maintain the position of the threaded adjuster 116 and the lock nut 118 is not needed.

A ball bearing 206 is disposed between the slave piston 114 and throw-out rod 201 for the purpose of providing support when the slave piston 114 acts on the throw-out rod 201. In another embodiment the throw-out rod 201 has a dome profile formed into its end eliminating the need for the ball. In another embodiment the slave piston 114 contacts the throw-out rod 201 directly.

Figure 3:
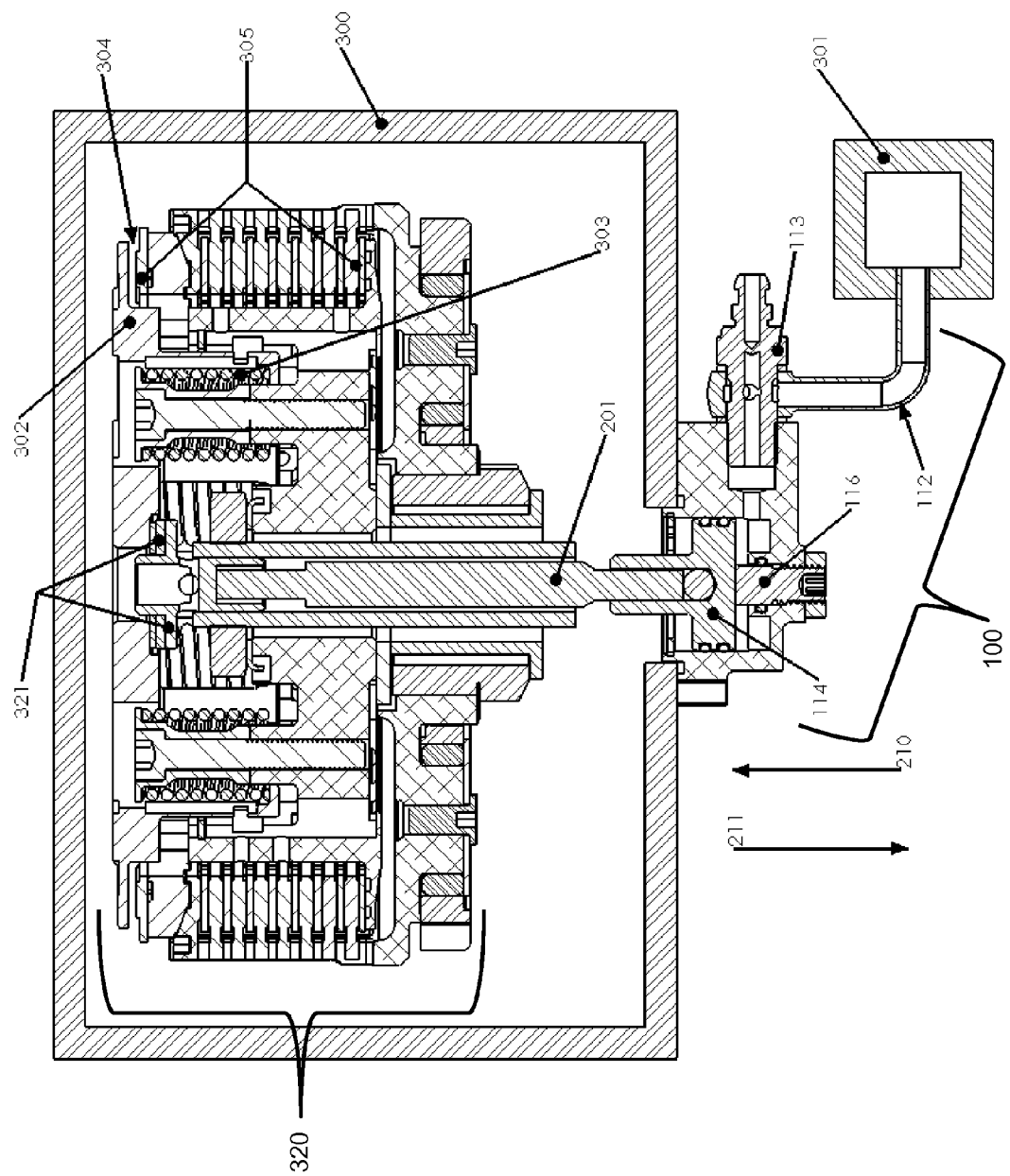
FIG. 3 is a section view of the present invention configured for use in a hydraulically actuated clutch disengagement system, containing an automatic clutch system incorporating an expanding friction disk, wherein the clutch disengagement system is not actuated and the novel adjuster mechanism is adjusted to lift the pressure plate to create an installed gap.

FIG. 3 depicts the novel adjustable slave cylinder 100 attached to an engine case 300 and master cylinder 301 through an input hydraulic line 112 using a banjo bolt 113. Contained within the engine case 300 is a clutch assembly 320 similar to what is disclosed in U.S. patent application Ser. No. 12/412,245. The clutch assembly 320 includes a pressure plate 302 with springs 303 which bias the pressure plate 302 in the inward direction 211. The clutch assembly 320 includes a throwout assembly 321 disposed between the pressure plate 302 and throwout rod 201.

FIG. 3 depicts the system in a state where the master cylinder 301 is not engaged and the threaded adjuster 116 of the novel adjustable slave cylinder 100 is adjusted in the outward direction 210 to lift the pressure plate 302 creating the installed gap 304 between the pressure plate 302 and clutch pack 305.

Figure 4:
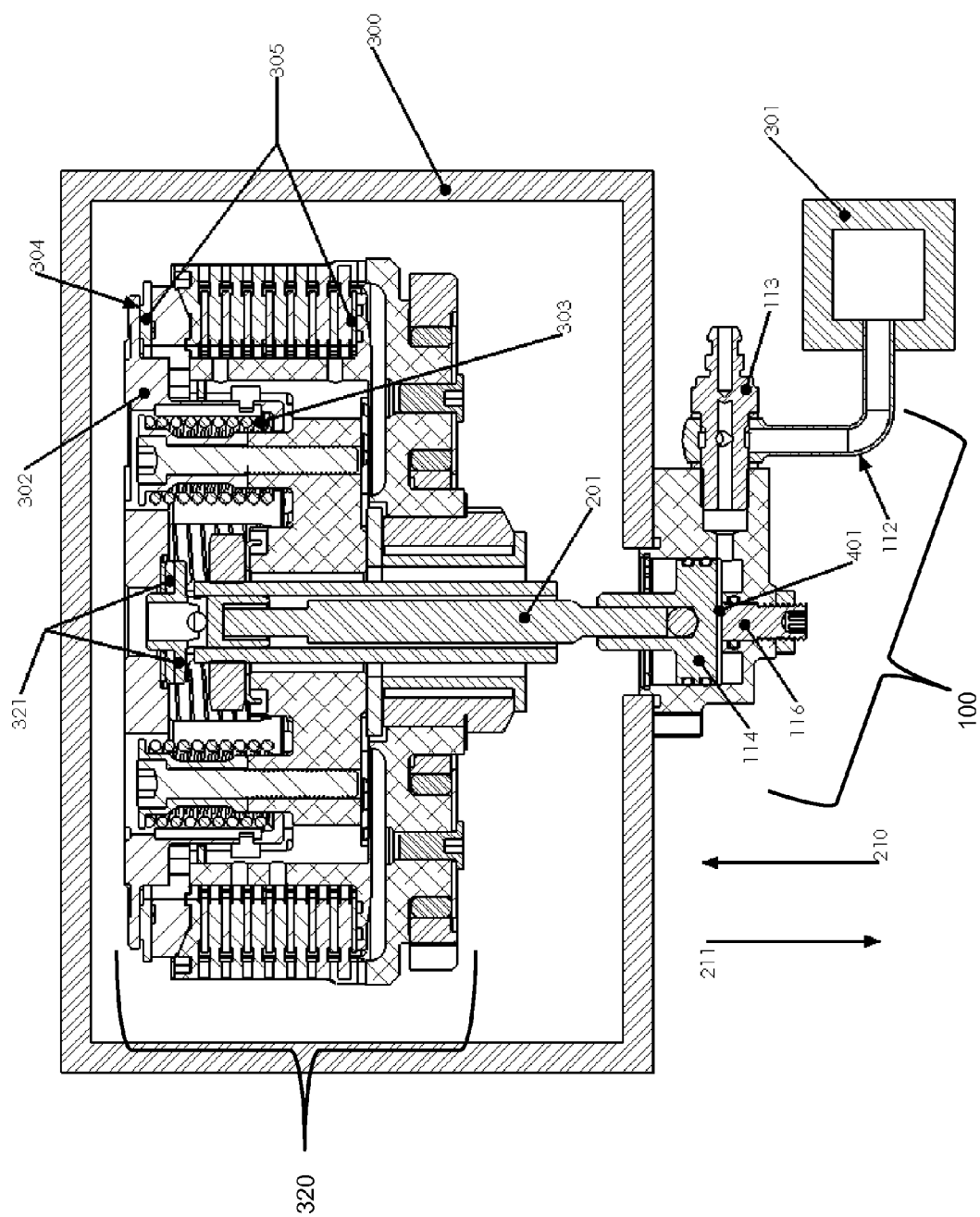
FIG. 4 is a section view of the present invention configured for use in a hydraulically actuated clutch disengagement system, containing an automatic clutch system incorporating an expanding friction disk, wherein the clutch disengagement system is not actuated and the novel adjuster mechanism is adjusted allowing the pressure plate to contact the clutch pack.

FIG. 4 depicts the system in a state where the master cylinder 301 is not engaged and threaded adjuster 116 of the novel adjustable slave cylinder 100 is adjusted in the inward direction 211 to eliminate the installed gap 304 allowing the pressure plate 302 to contact the clutch pack 305. An adjusted off gap 401 exists between the threaded adjuster 116 and slave piston 114 allowing the pressure plate 302 to position the slave piston 114 in the inward direction 211 via the springs 303 limited by the clutch pack 305. With the pressure plate 302 touching the clutch pack 305 the clutch assembly 320 is in a state where it can be bump started.

Figure 5:
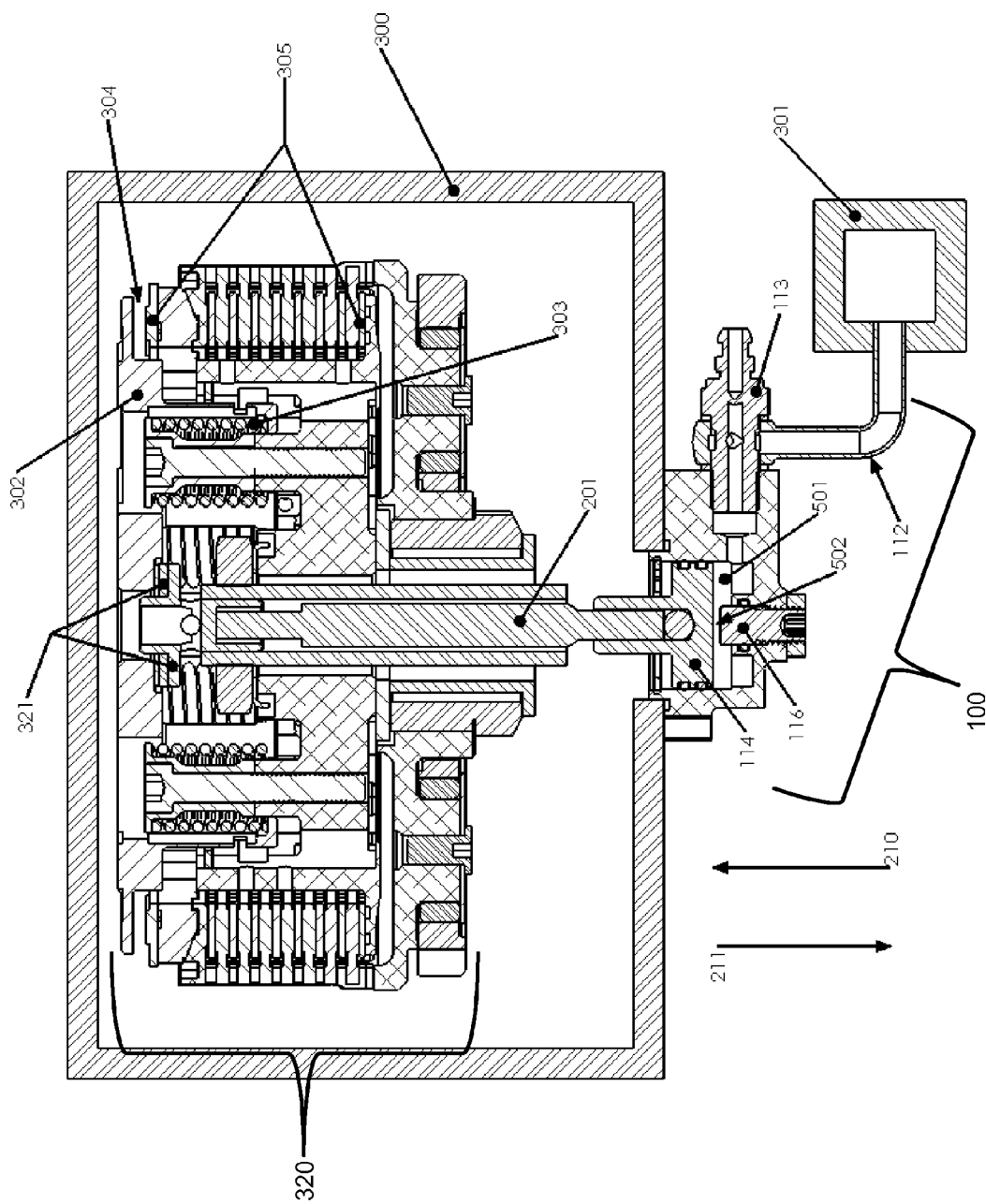
FIG. 5 is a section view of the present invention configured for use in a hydraulically actuated clutch disengagement system, containing an automatic clutch system incorporating an expanding friction disk, wherein the clutch disengagement system is actuated and the novel adjuster mechanism is no longer acting on the pressure plate.

FIG. 5 depicts the system in a state where the threaded adjuster 116 of the novel adjustable slave cylinder 100 is adjusted in to lift the pressure plate 302 and the master cylinder is engaged to further displace the pressure plate in the outward direction 210. The position of the threaded adjuster 116 is the same as shown in FIG. 3. However, in FIG. 5 the operator has engaged master cylinder 301 causing hydraulic fluid to be pushed into the input chamber 501 and displace the slave piston 114 in the outward direction 210 away from the master cylinder 301 further lifting the pressure plate 302 from the position in FIG. 3 consequently increasing the installed gap 304 to accommodate clutch disengagement via the engagement of the master cylinder 301. A disengaged gap 502 is formed between the threaded adjuster 116 and slave piston 114 via the displacement of the slave piston 114 from the master cylinder 301 being engaged.

FIG. 6 discloses a cross-section view of another embodiment of the novel adjustable slave cylinder 600 optimized for minimum width. This embodiment of the novel adjustable slave cylinder 600 consists of a body 610, having an input port 111 that connects the adjustable slave cylinder 600 to an input hydraulic line 112 using a banjo bolt 113. The adjustable slave cylinder 600 has a slave piston 614 with slave piston sealing o-rings 615. The adjustable slave cylinder 600 has a threaded adjuster 616 with adjuster o-ring seals 617.

FIG. 6 depicts a slave piston 614 which is configured to push against a throw-out rod 201. The adjustable slave cylinder 600 has a body 610 having a threaded hole 618 for the threaded adjuster 616 to thread into. The threaded adjuster has a groove 620 containing the adjuster o-ring seals 617. The adjustable slave cylinder 600 has a body 610 having an adjuster bore 619 which provides a sealing surface for the adjuster o-ring seals 617 to seal between the body 610 and the threaded adjuster 616 preventing hydraulic fluid from escaping the system and contaminants from entering the system. The adjustable slave cylinder 600 has a body 610 containing a bore 204 which contains the slave piston 614 with slave piston sealing x-rings 615. The slave piston sealing x-rings 615 provide a seal between the slave piston 614 and bore 204 in an outward direction 210 and inward direction 211 allowing the system to maintain pressure and prevent hydraulic fluid from escaping between the slave piston 614 and bore 204. The threaded adjuster 616 is configured to push against the slave piston 614 through the piston locating surface 205 for the purpose of positioning the slave piston 614 within the body 610.

The threaded adjuster 616 threads into the threaded hole 618 of the body 610. The threads of the threaded hole 618 and the threads of the threaded adjuster 616 are configured such that when the threaded adjuster 616 is turned clockwise relative to the body 610, the threaded adjuster 616 moves in an outward direction 210. Consequently, when the threaded adjuster 616 is turned counter-clockwise relative to the body 610, the threaded adjuster 616 moves in an inward direction 211.

The adjuster o-ring seals 617 are configured to provide adequate friction to maintain the position of the threaded adjuster 616.

A ball bearing 206 is disposed between the slave piston 614 and throw-out rod 201 for the purpose of providing support when the slave piston 614 acts on the throw-out rod 201.

The primary novel characteristic of the embodiment disclosed in FIG. 6 is a narrower slave piston 614 that allows the adjustable slave cylinder 600 to have a slimmer profile. To prevent the slave piston 614 from rocking in the bore and possibly becoming stuck, the slave piston 614 is configured with a centering boss 630 and groove 631. The centering boss 630 locates into the center pocket 632 of the body 610 which allows for proper slave piston 614 alignment when moved in an outward direction 210 or inward direction 211 within the bore 204 of the body 610. The centering boss 630, clearance groove 631 and center pocket 632 configured as shown minimize the width of the slave piston 614 allowing the novel adjustable slave cylinder 600 to have a slimmer profile while maintaining optimal axial alignment of the slave piston 614 with respect to the bore 204 of the body 610.

The present invention may be embodied in other specific forms without departing from its spirit or essential characteristics. For example, for one skilled in the art, the present invention could be adapted for use in other types of vehicles that use clutch disengagement systems. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A hydraulic clutch disengagement system comprising a master cylinder assembly and a slave cylinder assembly comprising a slave cylinder piston mechanically connected to a throwout rod, a threaded adjuster, and a slave cylinder body, said slave cylinder body including a hole to receive said threaded adjuster; wherein said threaded adjuster is operational external to an engine case to adjust the position of said slave cylinder piston and said throwout rod and said master cylinder assembly is operational such that when activated, said master cylinder assembly will displace said slave cylinder piston in a direction away from said threaded adjuster creating a disengaged gap between said slave cylinder piston and said threaded adjuster and when said master cylinder assembly is not activated, said slave cylinder piston is in contact with said threaded adjuster.

2. The hydraulic clutch disengagement system of claim 1 wherein said slave cylinder piston is operational to displace a pressure plate away from a clutch pack.

3. The hydraulic clutch disengagement system of claim 1 wherein said threaded adjuster is operational to create an installed gap between a pressure plate and an expandable friction disk.

4. The hydraulic clutch disengagement system of claim 3 wherein said threaded adjuster is operational to remove an installed gap between a pressure plate and an expandable friction disk.

5. The hydraulic clutch disengagement system of claim 1 further comprising an adjuster seal; said adjuster seal operational to prevent fluid from escaping from said slave cylinder assembly.

6. The hydraulic clutch disengagement system of claim 1 wherein said threaded adjuster is operational to create an installed gap between a pressure plate and a centrifugal mechanism.

* * * * *